United States Patent
Wei et al.

(10) Patent No.: US 12,279,282 B2
(45) Date of Patent: Apr. 15, 2025

(54) CHILD DISTRIBUTED UNIT RESOURCE CONFIGURATION INFORMATION SIGNALING IN 5G-NR INTEGRATED ACCESS BACKHAUL NETWORK

(71) Applicant: Apple Inc., Cupertino, CA (US)

(72) Inventors: Lili Wei, Portland, OR (US); Qian Li, Beaverton, OR (US); Dawei Ying, Hillsboro, OR (US); Gang Xiong, Portland, OR (US); Geng Wu, Portland, OR (US)

(73) Assignee: Apple Inc., Cupertino, CA (US)

( * ) Notice: Subject to any disclaimer, the term of this patent is extended or adjusted under 35 U.S.C. 154(b) by 605 days.

(21) Appl. No.: 17/434,106

(22) PCT Filed: Mar. 20, 2020

(86) PCT No.: PCT/US2020/023849
§ 371 (c)(1),
(2) Date: Aug. 26, 2021

(87) PCT Pub. No.: WO2020/198003
PCT Pub. Date: Oct. 1, 2020

(65) Prior Publication Data
US 2022/0150889 A1 May 12, 2022

Related U.S. Application Data

(60) Provisional application No. 62/822,373, filed on Mar. 22, 2019.

(51) Int. Cl.
*H04W 72/27* (2023.01)
*H04W 72/0446* (2023.01)

(52) U.S. Cl.
CPC ....... *H04W 72/27* (2023.01); *H04W 72/0446* (2013.01)

(58) Field of Classification Search
CPC . H04W 72/27; H04W 72/0446; H04W 40/24; H04L 41/0836
See application file for complete search history.

(56) References Cited

U.S. PATENT DOCUMENTS

| | | | |
|---|---|---|---|
| 11,792,891 B2* | 10/2023 | Li | H04W 24/02 370/329 |
| 2020/0145967 A1* | 5/2020 | Park | H04W 72/23 |
| 2021/0144705 A1* | 5/2021 | Li | H04W 28/0215 |

(Continued)

OTHER PUBLICATIONS

International Preliminary Report on Patentability Report dated Sep. 28, 2021 in connection with PCT Application No. PCT/US2020/023849.

(Continued)

*Primary Examiner* — Abdullahi Ahmed
(74) *Attorney, Agent, or Firm* — Eschweiler & Potashnik, LLC; Matthew W Glause

(57) ABSTRACT

Systems, methods, and circuitries are provided for communicating DU resource configuration information of a child IAB node to a parent IAB node. An example method includes identifying distributed unit (DU) resource configuration information for an IAB node device functioning as an IAB node in the IAB network, wherein the IAB node is associated with a parent IAB node, and transmitting the DU resource configuration information to the parent IAB node.

15 Claims, 4 Drawing Sheets

(56) References Cited

U.S. PATENT DOCUMENTS

| | | | | |
|---|---|---|---|---|
| 2021/0315043 A1* | 10/2021 | Luo | ...................... | H04W 72/27 |
| 2021/0345345 A1* | 11/2021 | Liu | ...................... | H04W 72/20 |
| 2022/0060247 A1* | 2/2022 | Harada | ............... | H04W 88/085 |
| 2022/0159517 A1* | 5/2022 | Miao | ...................... | H04W 28/26 |
| 2022/0166567 A1* | 5/2022 | Kurita | .................. | H04L 5/0094 |
| 2022/0182977 A1* | 6/2022 | Miao | ...................... | H04W 72/51 |
| 2022/0394679 A1* | 12/2022 | Liu | ...................... | H04W 72/04 |
| 2024/0073936 A1* | 2/2024 | Liu | ...................... | H04W 72/53 |

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 15); 3GPP TS 36.423 V15.4.0. (Dec. 2018); http://www.3gpp.org.
PCT Search Report dated May 29, 2020 in connection with PCT Application No. PCT/US2020/023849.
PCT Written Opinion dated May 29, 2020 in connection with PCT Application No. PCT/US2020/023849.
LG Electronics: "Discussion on resource multiplexing among backhaul and access links" 3GPP Draft; R1-1902080; vol. Ran QG1; Feb. 16, 2019; URL:http://www.3gpp.org/ftp/tsg%5Fran/WG1%5FRL1/TSGR1%5F96/Docs/R1%2D1902080%2Ezip.
"3rd Generation Partnership Project; Technical Specification Group Radio Access Network; NR; Study on Integrated Access and Backhaul; (Release 16)"; 3GPP Draft; 38874-G00; Jan. 11, 2019; URL:http;//www.3gpp.org/ftp/tsg%5Fran/WG2%5FRL2/Specifications/201812%5Ffinal%5Fspecs%5Fafter%5FRAN%5F82/38874%2Dg00%2Ezip.
Ericson; "IAB resource allocation and multiplexing (revision of R1-1813566)"; 3GPP Draft; R1-1814090; vol. Ran WG1; Nov. 15, 2018; URL:http://www.3gpp.org/ftp/tsg%5Fran/WG1%5FRL1/TSGR1%5F95/Docs/R1%2D1814090%2Ezip.
AT&T: "Summary of 7.2.3.4 Mechanisms for resource multiplexing among backhaul and access links"; 3GPP Draft; R1-1901455; vol. Ran WG1; Jan. 25, 2019; URL:http://www.3gpp.org/ftp/tsg%5Fran/WG1%5FRL1/TSGR1%5FAH/NR%5FAH%5F1901/Docs/R1%2D1901455%2Ezip.
"3rd Generation Partnership Project; Technical Specification Group Radio Access Network; NR; Physical layer; General description; (Release 15)"; 3GPP TS 38.201 V15.0.0; Dec. 2017; pp. 2-12.
"3rd Generation Partnership Project; Technical Specification Group Radio Access Network; NR; Physical layer procedures for control; (Release 15)"; 3GPP TS 38.213 V15.4.0; Dec. 2018; pp. 2-104.
"3rd Generation Partnership Project; Technical Specification Group Radio Access Network; NR; NR and NG-RAN Overall Description; Stage 2; (Release 15)"; 3GPP TS 38.300 V15.4.0; Dec. 2018; pp. 2-97.
"3rd Generation Partnership Project; Technical Specification GroupRadio Access Network; NG-RAN; NG general aspects and principles (Release 15)"; 3GPP TS 38.410 V15.2.0; Dec. 2018; pp. 2-15.
"3rd Generation Partnership Project; Technical Specification Group Radio Access Network; NG-RAN; F1 application protocol (F1AP) (Release 15)"; 3GPP TS 38.473 V15.4.1; Jan. 2019; pp. 2-192.
Huawei, HiSilicon; "Resource multiplexing between backhaul and access in IAB"; 3GPP TSG RAN WGI Meeting #96; R1-1901533; Feb. 25, 2019; pp. 1-8.

* cited by examiner

CHILD DISTRIBUTED UNIT RESOURCE CONFIGURATION INFORMATION SIGNALING IN 5G-NR INTEGRATED ACCESS BACKHAUL NETWORK

CROSS REFERENCE TO RELATED APPLICATIONS

This application is a National Phase entry application of International Patent Application No. PCT/US2020/023849, filed on Mar. 20, 2020, which claims priority to U.S. Provisional Patent Application No. 62/822,373, filed on Mar. 22, 2019, entitled "SIGNALING FOR PARENT DU REGARDING ITS CHILD DU RESOURCE ALLOCATION IN 5G-NR IAB," which is incorporated herein by reference for all purposes.

BACKGROUND

The logical architecture of an integrated access backhaul (IAB) network is composed of multiple IAB-nodes and IAB donors. IAB nodes have wireless backhauling capabilities and can serve User Equipments (UEs) as well as other IAB-nodes. IAB-donors have fiber connectivity towards the core network and can serve UEs and IAB-nodes. Each IAB-node hosts two NR functions: (i) a Mobile Termination (MT), used to maintain the wireless backhaul connection towards an upstream IAB-node or IAB-donor, and (ii) a Distributed Unit (DU), to provide access connection to the UEs or the downstream MTs of other IAB-nodes. The DU connects to a central unit (CU) hosted by the IAB-donor by means of the NR F1-AP interface running over the wireless backhaul link.

The CU at the IAB-donor holds the control and upper layer functionalities, while the lower layer operations are delegated to the DUs located at the IAB nodes. The Radio Resource Control (RRC), Service Data Adaptation Protocol (SDAP) and Packet Data Convergence Protocol (PDCP) layers reside in the CU, while Radio Link Control (RLC), Media Access Control (MAC) and Physical Layer (PHY) are hosted by the DUs. An additional adaptation layer is added on top of RLC, which routes the data across the IAB network topology, hence enabling the end-to-end connection between DUs and the CU.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

The present disclosure is described with reference to the attached figures. The figures are not drawn to scale and they are provided merely to illustrate the disclosure. Several aspects of the disclosure are described below with reference to example applications/use cases for illustration. Numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the selected present disclosure.

In an integrated access and backhaul (IAB) network, an IAB DU can be configured with DL/UL/Flexible/Not Available/Hard/Soft (D/U/F/NA/H/S) resources. An IAB DU's resource configuration should also be known to its parent DU (P-DU). For example, in case of hard resources have been configured to an IAB DU, the DU will use the resources regardless of the co-located IAB MT's configuration. If the P-DU knows the IAB DU's hard resources configuration, the P-DU can avoid the IAB MT's scheduling at the same resources. In another example, when soft resources have been configured to an IAB DU and explicit indication of soft availability from P-DU to the IAB node is chosen, the P-DU should also know the IAB DU's soft resource configuration. Hence, an IAB DU's resource configuration should also be known (partially or fully) to its parent DU.

Since an IAB DU's resource configuration should also be known (partially or fully) to its parent DU (P-DU), this description outlines several options for indicating DU resource configuration information about an IAB DU's resource configuration to the IAB DU's parent node. Several different signaling methods are also outlined for transmitting the DU resource-related information to the parent IAB node.

Figures 1, 1A:
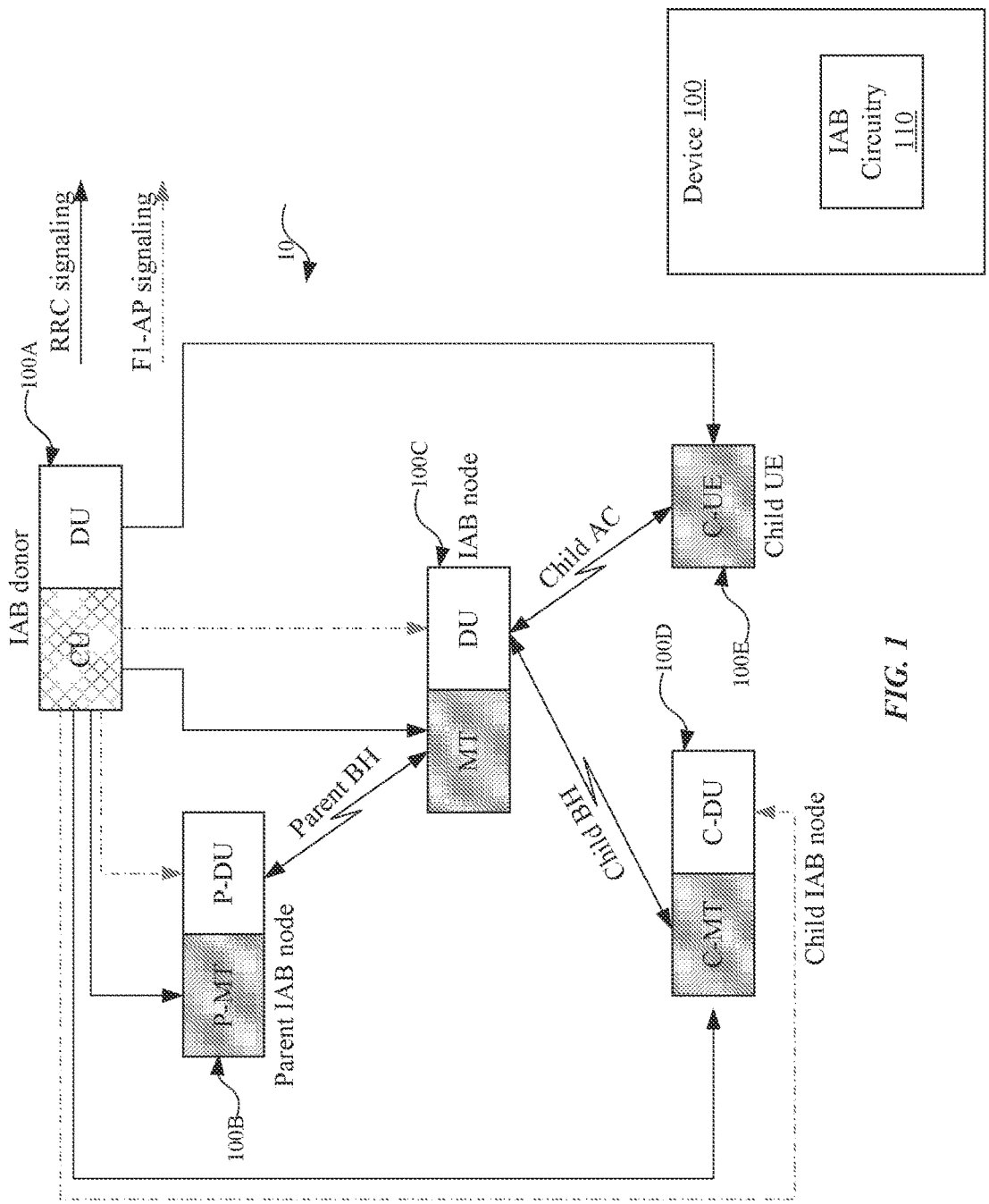
FIG. 1 is a block diagram illustrating an example IAB network, according to various aspects disclosed.
FIG. 1A is a block diagram of an example wireless communication device that includes IAB circuitry, according to various aspects disclosed.
Figure 5:
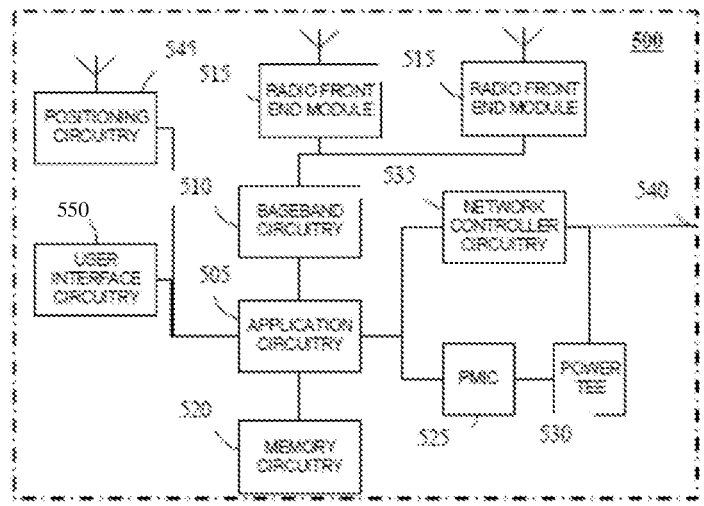
FIG. 5 illustrates an example of an infrastructure equipment device (e.g., gNB), in accordance with various aspects disclosed.
Figure 6:
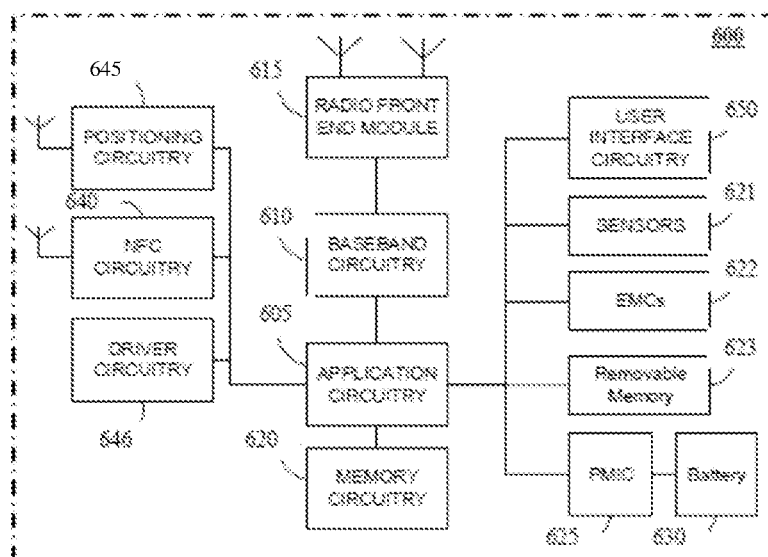
FIG. 6 illustrates an example of a user equipment device (e.g., UE), in accordance with various aspects disclosed.

FIG. 1 illustrates a wireless communication network 10 that includes several wireless communication devices 100A-E connected in an Integrated Access and Backhaul (IAB) Network. An example wireless communication network is described in more detail with reference to FIG. 4. The wireless communication devices 100 include IAB circuitry 110 (e.g., a baseband processor or one or more processors) that is configured to cause the device to perform a mobile termination (MT) function, a distributed unit (DU) function, and/or a central unit (CU) function. In the following description, when a device 100 is described as performing some function, it is to be understood that the IAB circuitry 110 is causing the device to perform the function. In one example, the IAB circuitry 110 includes a processor (e.g., a baseband processor) executing stored instructions to perform the function. An example infrastructure equipment device is illustrated in FIG. 5 and an example UE device is illustrated in FIG. 6. Either of these types of devices can be used as IAB nodes in the IAB network, as will be described below.

In an IAB network, an IAB node can connect to its parent node (an IAB donor or another IAB node) through parent backhaul (BH) link; connect to a child user equipment (UE) through child access (AC) link; and connect to its child IAB node through child BH link. In current IAB network architectures, central unit (CU)/distributed unit (DU) split has been leveraged where each IAB node holds a DU function and a Mobile-Termination (MT) function. Via the MT function, the IAB node connects to its parent IAB node or the IAB-donor like a UE. Via the DU function, the IAB node communicates with its child UEs and child MTs like a base station. RRC signaling is used between the CU in the IAB donor and the UE/MT. F1-AP signaling is used between the CU and the DU in an IAB node. In FIG. 1 MT and DU in a parent IAB node are labeled as P-MT, P-DU, respectively; while MT and DU in a child IAB node are labeled as C-MT and C-DU, respectively; and a child UE is labeled as C-UE.

IAB DU Resource Allocation

In an IAB network, time-domain resource allocation has several variations. From a MT point-of-view, the following time-domain resources can be indicated for the parent link as in NR Release-15: downlink time resource, uplink time resource, and flexible time resource (shorthand notation is (D/U/F)). From a DU point-of-view, the child link has the following types of time-domain resources: downlink time resource, uplink time resource, flexible time resource, not available time resources (not to be used for communication on the DU child links) (shorthand notation is (D/U/F/NA)). For each of the downlink, uplink, and flexible time-resource types of the DU child link, there are two types: hard and soft (H/S). In a hard allocation the corresponding time resource is always available for the DU child link. In a soft allocation, the availability of the corresponding time resource for the DU child link is explicitly and/or implicitly controlled by the parent node.

Resource allocation for DU may be performed based on several assumptions. First, at least existing resource definitions (D/U/F) and semi-static and dynamic signaling methods defined in Rel-15 for access UEs are reused for configuration and indication of MT resources to be used by the backhaul link between the IAB node and its parent. Second, IAB-node/IAB-donor DU resources are provided by a semi-static configuration which is provided separately from the MT resource indication. Third, inter-IAB node conflict resolution can be supported by the one or more of the following options. In a first option, the parent node is aware of all of the DU resource configurations (D/U/F/H/S/NA) of its child IAB node DUs. In a second option, the parent node may be made aware of a subset of the DU resource configurations (D/U/F/H/S/NA) of its child IAB node DUs. The indication of the child DU resources at the parent may be by either explicit (e.g. F1-AP signaling) or implicit (e.g. based on child MT configuration) means.

For an IAB MT or a UE, semi-static and dynamic indication of D/U/F time-domain resource allocation can be supported in Rel-15 design. For semi-static indication, RRC signaling tdd-UL-DL-ConfigurationCommon for cell-specific configuration and tdd-UL-DL-ConfigurationDedicated for UE-specific configuration can be used and for dynamic indication, the combination of RRC signaling SlotFormat-Indicator and DCI format 2_0 can be used. Taking the example in FIG. 1, the D/U/F time resource indication to MT will be used for parent BH link; the D/U/F time resource indication to C-MT will be used for child BH link; and the D/U/F time resource indication to C-UE will be used for child AC link.

For an IAB DU, semi-static configuration schemes have already been proposed regarding (D/U/F/NA/H/S) resource types, either by introducing new F1-AP signaling from the CU of IAB donor to the IAB DU, or by introducing new RRC signaling from the CU of IAB donor to the IAB MT, which is co-located with the IAB DU. However, an IAB DU's resource configuration should also be known to its parent DU (P-DU). For example, when hard resources have been configured to an IAB DU, the DU will use the resources regardless of the co-located IAB MT's configuration. If the P-DU knows the IAB DU's hard resources configuration, the P-DU can avoid the IAB MT's scheduling at the same resources. In another example, when soft resources have been configured to an IAB DU and explicit indication of soft availability from P-DU to the IAB node is chosen, the P-DU also should know the IAB DU's soft resource configuration. Hence, an IAB DU's resource configuration should also be known (partially or fully) to its parent DU (P-DU).

IAB DU Resource Configuration Information to be Communicated to the P-DU

In one example, the DU resource configuration information communicated to the P-DU regarding an IAB DU's resource configuration depends on the semi-static resource configuration schemes for the DU. In a first scheme, an IAB DU's semi-static resource configuration only considers H/S/NA indication; the per-link D/U/F configuration is aligned with each child link's D/U/F configuration; and no additional per-link D/U/F configuration is needed for the DU. In a second scheme, an IAB DU's semi-static resource configuration includes D/U/F/NA indications which do not overlap with each other, and a H/S indication on the configured D/U/F. In a third scheme, an IAB DU's semi-static resource configuration includes hard-downlink/hard-uplink/hard-flexible/soft-downlink/soft-uplink/soft-flexible/not available (H-D/H-U/H-F/S-D/S-U/S-F/NA) indications.

Accordingly, there can be the following options for the information carried to the P-DU regarding an IAB DU's resource configuration.

In a first option, only the hard resource configuration information of an IAB DU is communicated to the P-DU, since the P-DU should know the DU's hard resources, so that the P-DU will not schedule any transmission between the P-DU and the IAB MT using the hard resources. Regarding the IAB DU's soft resources, the soft availability may implicitly indicated. In one example, the IAB node monitors the DCI from P-DU to identify soft resources. Note that if this first option is applied for DU configuration scheme 3 described above, it means that although H-D/H-U/H-F/S-D/S-U/S-F/NA resource types are configured to an IAB DU, the P-DU is communicated with all hard resources (including H-D/H-U/H-F) without differentiating D/U/F.

In a second option, the hard and soft resource configuration information for an IAB DU are communicated to the P-DU. In this option, in addition to hard resources, the soft resource configuration information is also communicated to the P-DU so that the P-DU can explicitly indicate the soft resource availability according to the DU's soft resource configuration. Note that if this second option is applied for DU configuration scheme 3 described above, it means that although H-D/H-U/H-F/S-D/S-U/S-F/NA resource types are configured to an IAB DU, the P-DU is informed with all hard resources (including H-D/H-U/H-F) and all soft resources (including S-D/S-U/S-F), without differentiating D/U/F.

In a third option, in addition to the resource configuration information carried in the second option, NA resource configuration information is also communicated to the P-DU, so that the P-DU knows that it does not need to consider the IAB DU at those resources.

In a fourth option, the D/U/F/H/S/NA resource configuration information for an IAB DU is communicated to the P-DU, so that the P-DU has all the knowledge of the IAB DU's resource configuration for the first and second schemes described above. When this fourth option is applied for DU resource configuration in the third scheme described above, the D indication includes H-D/S-D, the U indication includes H-U/S-U, and so on. The H indication includes H-D/H-U/H-F, while S indication includes S-D/S-U/S-F. Hence, with this fourth option, the P-DU also has all the knowledge of the IAB DU's resource configuration for the third scheme.

In a fifth option, the H-D/H-U/H-F resource configuration information for an IAB DU is communicated to the P-DU. This means that the P-DU will know the DU's hard resources with D/U/F differentiation for the third scheme described above.

In a sixth option, the H-D/H-U/H-F/S-D/S-U/S-F resource configuration information for an IAB DU is communicated to the P-DU. This means the P-DU will know the DU's soft resources with D/U/F differentiation for the third scheme described above.

In a seventh option, the H-D/H-U/H-F/S-D/S-U/S-F/NA resource configuration information for an IAB DU is communicated to the P-DU. This means that the P-DU will know all the DU's resource configuration for the third scheme described above.

Method for Signaling IAB DU Resource Configuration Information to the P-DU

Figure 2:
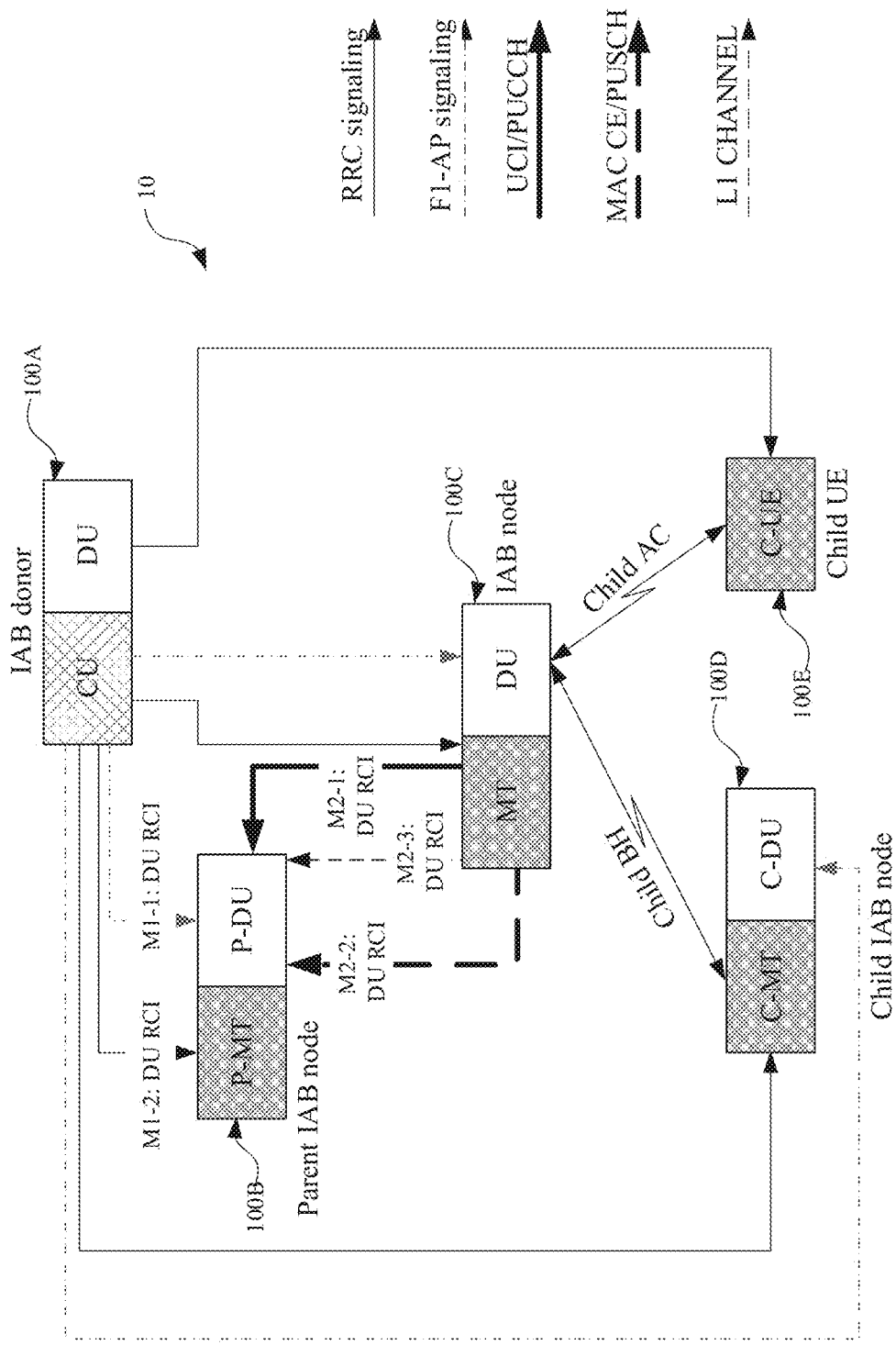
FIG. 2 is a block diagram illustrating several example methods of communication of DU resource configuration information to a parent IAB node, according to various aspects disclosed.

FIG. 2 illustrates several different options for signaling that can be used to transmit DU resource configuration information ("DU RCI" in FIG. 2) for the IAB node 100C to the parent IAB node 100B. In a first CU source method ("M1-1" in FIG. 2) new F1-AP signaling from the CU of the IAB donor 100A to the DU of the parent IAB node 100B is used to communicate the DU resource configuration information for the IAB node 100C. When the CU of IAB donor 100A configures resource allocation information for the DU of IAB node 100C, the CU of IAB donor 100A can also send the IAB DU resource configuration information describing the allocated resources to the DU of parent IAB node 100B via F1-AP signaling.

Possible F1-AP protocol extension embodiments to support F1-AP signaling of DU resource configuration to a parent IAB node include: i) enhancement of the existing GNB-DU RESOURCE COORDINATION REQUEST F1-AP message; ii) enhancement of the existing GNB-CU CONFIGURATION UPDATE F1-AP message, and/or iii) introduction of a new dedicated F1-AP message.

The current F1-AP message of NG-RAN F1 application protocol (F1AP)] is sent by a gNB-CU to a gNB-DU, to express the desired resource allocation for data traffic, for the sake of resource coordination. The message triggers gNB-DU resource coordination (for NR-initiated resource coordination), to indicate an initial resource offer by the E-UTRA node (for E-UTRA-initiated gNB-DU Resource Coordination), or to indicate the agreed resource allocation that is to be executed, or to indicate IAB resource coordination information. To transmit to a parent DU regarding its child IAB DU's resource configuration information (only the hard resource configuration of an IAB DU is communicated to the P-DU for Option 1), the extension to the GNB-DU RESOURCE COORDINATION REQUEST message can be defined as follows in Table 1 [see 3GPP TS138.473 version 15.2.1 Rel-15 section 9.2.1.13]. Extensions or enhancements of other F1-AP messages can be defined in a similar manner.

TABLE 1

| IE/Group Name | Presence | Range | IE type and reference | Semantics description | Criticality | Assigned Criticality |
| --- | --- | --- | --- | --- | --- | --- |
| Message Type | M | | 9.3.1.1 | | YES | reject |
| Transaction ID | M | | 9.3.1.23 | | YES | reject |
| Request type | M | | ENUMERATED (offer, execution, . . . ) | | YES | reject |
| E-UTRA – NR Cell Resource Coordination Request Container | O | | OCTET STRING | Includes the X2AP E-UTRA – NR CELL RESOURCE COORDINATION REQUEST message as defined in subclause 9.1.4.24 in TS 36.423 [9]. | YES | reject |
| IAB Cell Resource Coordination Request | O | | | | | |
| >>List of NR Cells in NR Coordination Request | | 0 . . . < maxnoNRcells> | | List of applicable NR cells | YES | reject |
| >>>AR-Cell ID | M | | NR-CGI 9.2.105 | | — | — |
| >>>Subframe Assignment | M | | ENUMERATED(dl, ul, f, . . . ) | Uplink-downlink subframe configuration information. | — | — |
| >>>AR-Child Cell ID | O | | NR-CGI 9.2.105 | Child IAB node cell ID | — | — |
| >>>Child Subframe Assignment | O | | ENUMERATED(hard, . . . ) | Uplink-downlink subframe configuration information for a child IAB DU | — | — |

TABLE 1-continued

| IE/Group Name | Presence | Range | IE type and reference | Semantics description | Criticality | Assigned Criticality |
|---|---|---|---|---|---|---|
| >>>frequency resource | M | | OCTET STRING | Frequency resource configuration information | — | — |

In a variation of the CU source method ("M1-2" in FIG. 2) new RRC signaling from the CU of the IAB donor 100A to the MT of the parent IAB node 100B is used to communicate the DU resource configuration information for the IAB node 100C. When the CU of IAB donor 100A configures resource allocation information for the DU of IAB node 100C, the CU of IAB donor 100A can also send the IAB DU resource configuration information to the DU of parent IAB node 100B via RRC signaling so that the co-located P-DU can also have those information.

In one example of method M1-2, RRC cell-specific semi-static downlink-uplink (DL-UL) configuration signaling TDD-UL-DL-ConfigCommon is extended to accommodate the child DU's resource configuration information. One implementation of this method with DU resource configuration information according to the first option (only hard resource configuration is indicated) described above. Extensions of TDD-UL-DL-ConfigCommon for other two options can be derived similarly. The child DU's resource pattern are configured via the child DU's cell ID, child DU's DL-UL pattern periodicity, and a list of hard resource blocks (modifications shown below in bold with the starting slot/symbol and the duration of each hard resource block explicitly indicated).

```
TDD-UL-DL-ConfigCommon ::=     SEQUENCE {
    referenceSubcarrierSpacing     SubcarrierSpacing,
    pattern1                TDD-UL-DL-Pattern       OPTIONAL,
    pattern2                TDD-UL-DL-Pattern       OPTIONAL,
    child-DU1-pattern       Child-DU-Pattern        OPTIONAL,
    child-DU2-pattern       Child-DU-Pattern        OPTIONAL,
    ...
}
Child-DU-Pattern ::=     SEQUENCE {
    child-DU-cellID     PhysCellId,
    child-DU-dl-UL-TransmissionPeriodicity
     ENUMERATED{ms0p5,ms0p625,ms1,ms1p25,ms2,ms2p5,ms5,ms10},
    hardBlockList       SEQUENCE {SIZE(0..maxNrofHardBlocks)} of
Hard Block,
    ...,
}
HardBlock ::=       SEQUENCE {
    hard BlockStartingSlot,   INTEGER(0..maxNrofSlots-1),
    hardBlockStartingSymbol,  INTEGER(0..maxNrofSymbols-1),
    hardBlockDurationSlots,   INTEGER(0..maxNrofSlots-1),
    hardBlockDurationSymbols, INTEGER(0..maxNrofSymbols-1),
}
```

Field Description:

| Child-DU-Pattern field description |
|---|
| child-DU-cellID |
| The child DU's cell ID |
| child-DU-dl-UL-TransmissionPeriodicity |
| Periodicity of the child DU's DL-UL pattern |
| hardBlockList |
| A list of hard resource blocks of the child DU |

Field Description:

| HardBlock field description |
|---|
| hardBlockStartingSlot |
| Specifies the starting slot of the child DU's hard resource block |
| hardBlockStartingSymbol |
| Specifies the starting symbol of the child DU's hard resource block |
| hardBlockDurationSlots |
| Specifies the duration slots of the child DU's hard resource block |
| hardBlockDurationSymbols |
| Specifies the duration symbols of the child DU's hard resource block |

In another example of method M1-2, RRC user-specific semi-static DL-UL configuration RRC signaling TDD-UL-DL-ConfigDedicated can be extended to accommodate the child DU's resource configuration information. The extension of TDD-UL-DL-ConfigDedicated is shown below with DU resource configuration related information as per the first option (only hard resource configuration is indicated) as described above. Extensions for the other options can be derived similarly.

```
TDD-UL-DL-ConfigDedicated ::=    SEQUENCE {
    slotSpecificConfigurationsToAddModList SEQUENCE
(SIZE(1..maxNrofSlots))
                                OF TDD-UL-DL-SlotConfig OPTIONAL,
    slotSpecificConfigurationsToreleaseList SEQUENCE (SIZE
(1..maxNrofSlots))
                                OF TDD-UL-DL-SlotIndex OPTIONAL,
    child-DU1-slotSpecificConfigurationsToAddModList SEQUENCE
(SIZE(1..maxNrofSlots))
                                OF Child-DU-SlotConfig OPTIONAL,
    child-DU1-slotSpecificConfigurationsToreleaseList SEQUENCE (SIZE
(1..maxNrofSlots))
                                OF Child-DU-SlotIndex OPTIONAL,
    child-DU2-slotSpecificConfigurationsToAddModList SEQUENCE
(SIZE(1..maxNrofSlots))
                                OF Child-DU-SlotConfig OPTIONAL,
    child-DU2-slotSpecificConfigurationsToreleaseList SEQUENCE (SIZE
(1..maxNrofSlots))
                                OF Child-DU-SlotIndex OPTIONAL,
    ...
}
Child-DU-SlotConfig ::=    SEQUENCE {
    child-DU-cellID        PhysCellId
    slotIndex              Child-DU-SlotIndex,
    hardsymbols            BIT STRING (SIZE (14)),
    ...
}
Child-DU-SlotIndex ::=    INTEGER (0..maxNrofSlots-1)
```

Field Description:

Child-DU-SlotConfig field description child-DU-cellID
The child DU's cell ID
slotIndex
Identifies a slot within a child DU's dl-UL-TransmissionPeriodicity.
hardsymbols
A bit stream indication of the 14 symbols in a slot is hard or not ("1" denotes hard).

Another example method of communicating DU resource configuration information to a parent IAB node 100B uses the MT of the IAB node 100C as the source of the communication. In a first variation of this method (M2-1), a new uplink control information (UCI) type is defined for communicating IAB DU resource configuration information. The UCI is carried by the physical uplink control channel (PUCCH). The PUCCH resource used to carry the new UCI type may be semi-statically configured or based on semi-persistent scheduling or dynamic scheduling.

In a second variation of the IAB MT source based method (M2-2), the DU resource configuration information for IAB node 100C is transmitted using a medium access control (MAC) control element (CE) carried by the physical uplink shared channel (PUSCH), which can be either dynamic triggered or configured grant. In the current NR specification [3GPP TS38.321 "NR; MAC protocol specification"], the logic channel ID (LCID) field which identifies the logical channel instance of the corresponding MAC service data unit (SDU) or the type of the corresponding MAC CE or padding for the uplink shared channel (UL-SCH) is described in the following Table. One of the reserved LCID (33-51), can be used to transmit the IAB DU resource configuration related information from the MT of the IAB node 100C to it's the DU of its parent IAB node.

TS38.321 Table 6.2.1-2 Values of LCID for UL-SCH

| Index | LCID values |
|---|---|
| 0 | CCCH of size 64 bits |
| 1-32 | Identity of the logical channel |
| 33-51 | Reserved |
| 52 | CCCH of size 48 bits |
| 53 | Recommended bit rate query |
| 54 | Multiple Entry PHR (four octet $C_i$) |

-continued

| Index | LCID values |
|---|---|
| 55 | Configured Grant Confirmation |
| 56 | Multiple Entry PHR (one octet $C_j$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

In a third variation of the IAB MT source based method (M2-3), if a L1 channel is added to the current specification, the IAB DU resource configuration information over is transmitted by the IAB node 100C in this newly defined L1 channel.

The figures and description below describe systems and implementations that are relevant to various embodiments. In general, the IAB nodes may correspond to access nodes of RAN XQ10, for example, and the C-UE may correspond to UEs XQ01a or XQ01b.

Following are one or more flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

As used herein, the term select when used with reference to some entity or value of an entity is to be construed broadly as encompassing any manner of determining the entity or value of the entity from amongst a plurality or range of possible choices. For example, the term select is to be construed to encompass accessing and reading memory (e.g., lookup table, register, device memory, remote memory, and so on) that stores the entities or values for the entity and returning one entity or entity value from amongst those stored. The term select is to be construed as applying one or more constraints or rules to an input set of parameters to determine an appropriate entity or entity value. The term select is to be construed as broadly encompassing any manner of choosing an entity based on one or more parameters or conditions.

Figure 3:
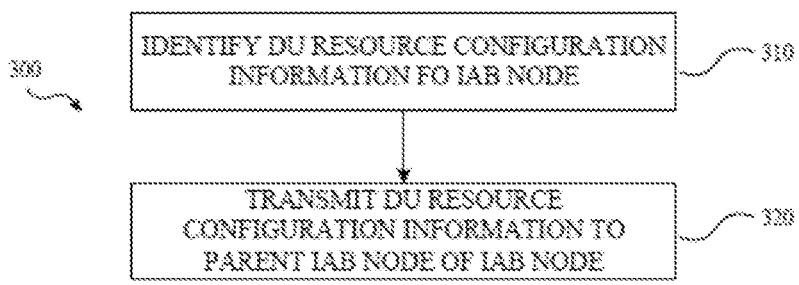
FIG. 3 is a flow diagram illustrating an example method for communicating DU resource configuration information to a parent IAB node, according to various aspects disclosed.

FIG. 3 depicts a flow diagram outlining a method 300 for communicating DU resource configuration information to a parent IAB node. The method includes, at 310, identifying distributed unit (DU) resource configuration information for an IAB node device functioning as an IAB node in the IAB network, wherein the IAB node is associated with a parent IAB node. At 320, the DU resource configuration information is transmitted to the parent IAB node.

Figure 4:
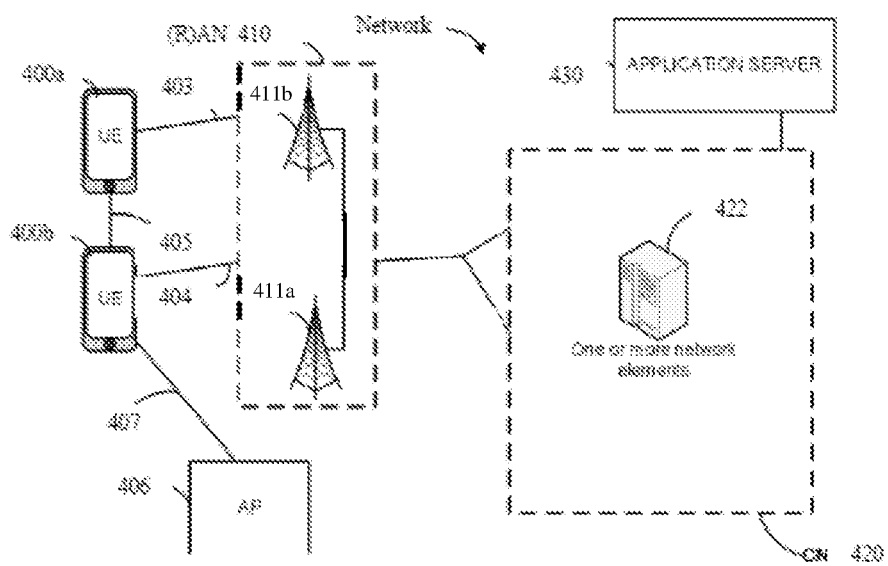
FIG. 4 illustrates an example communication network, in accordance with various aspects disclosed.

FIG. 4 illustrates an example architecture of a communication network (e.g., an IAB network), in accordance with various embodiments. The following description is provided for an example network that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 4, the network includes UE 400a and UE 400b (collectively referred to as "UEs 400" or "UE 400"). In this example, UEs 400 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, any of the UEs 400 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 400 may be configured to connect, for example, communicatively couple, with a RAN 410. In embodiments, the RAN 410 may be an NG RAN or a 5G RAN, an E-UTRAN, or a legacy RAN, such as a UTRAN or GERAN. As used herein, the term "NG RAN" or the like may refer to a RAN 410 that operates in an NR or 5G system, and the term "E-UTRAN" or the like may refer to a RAN 410 that operates in an LTE or 4G system. The UEs 400 utilize connections (or channels) 403 and 404, respectively, each of which comprises a physical communications interface or layer (discussed in further detail below).

In this example, the connections 403 and 404 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 400 may directly exchange communication data via a ProSe interface 405. The ProSe interface 405 may alternatively be referred to as a SL interface 405 and may comprise one or more logical channels, including but not limited to a PSCCH, a PSSCH, a PSDCH, and a PSBCH.

The UE 400*b* is shown to be configured to access an AP 406 (also referred to as "WLAN node 406," "WLAN 406," "WLAN Termination 406," "WT 406" or the like) via connection 407. The connection 407 can comprise a local wireless connection, such as a connection consistent with any IEEE 802.11 protocol, wherein the AP 406 would comprise a wireless fidelity (Wi-Fi®) router. In this example, the AP 406 is shown to be connected to the Internet without connecting to the core network of the wireless system (described in further detail below). In various embodiments, the UE 400*b*, RAN 410, and AP 406 may be configured to utilize LWA operation and/or LWIP operation. The LWA operation may involve the UE 400*b* in RRC_CONNECTED being configured by a RAN node 411*a-b* to utilize radio resources of LTE and WLAN. LWIP operation may involve the UE 400*b* using WLAN radio resources (e.g., connection 407) via IPsec protocol tunneling to authenticate and encrypt packets (e.g., IP packets) sent over the connection 407. IPsec tunneling may include encapsulating the entirety of original IP packets and adding a new packet header, thereby protecting the original header of the IP packets.

The RAN 410 can include one or more AN nodes or RAN nodes 411*a* and 411*b* (collectively referred to as "RAN nodes 411" or "RAN node 411") that enable the connections 403 and 404. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs, TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node 411 that operates in an NR or 5G system (for example, a gNB), and the term "E-UTRAN node" or the like may refer to a RAN node 411 that operates in an LTE or 4G system (e.g., an eNB). According to various embodiments, the RAN nodes 411 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

According to various embodiments, the UEs 400 and the RAN nodes 411 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 400, AP 406, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MOOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different path losses. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 400 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UEs 400. The PDCCH carries information about the transport format and resource allocations related to the PDSCH channel, among other things. It may also inform the UEs 400 about the transport format, resource allocation, and HARQ information related to the uplink shared channel. Typically, downlink scheduling (assigning control and shared channel resource blocks to the UE 400*b* within a cell) may be performed at any of the RAN nodes 411 based on channel quality information fed back from any of the UEs 400. The downlink resource assignment information may be sent on the PDCCH used for (e.g., assigned to) each of the UEs 400.

The RAN 410 is shown to be communicatively coupled to a core network—in this embodiment, core network (CN) 420. The CN 420 may comprise a plurality of network elements 422, which are configured to offer various data and telecommunications services to customers/subscribers (e.g., users of UEs 400) who are connected to the CN 420 via the RAN 410. The components of the CN 420 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 420 may be referred to as a network slice, and a logical instantiation of a portion of the CN 420 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

FIG. 5 illustrates an example of infrastructure equipment device 500 in accordance with various embodiments. The infrastructure equipment device 500 (or "device 500") may be implemented as a base station, radio head, RAN node such as the RAN nodes 411 and/or AP 406 shown and described previously, application server(s) 430, and/or any other element/device discussed herein. In other examples, the device 500 could be implemented in or by a UE. The device 500 may be configured with IAB network functions including a mobile termination (MT) function, a distributed unit (DU), and/or central unit (CU) function to serve as an IAB node, IAB parent node, IAB child node, and/or IAB donor node.

The device 500 includes application circuitry 505, baseband circuitry 510, one or more radio front end modules (RFEMs) 515, memory circuitry 520, power management integrated circuitry (PMIC) 525, power tee circuitry 530, network controller circuitry 535, network interface connector 540, satellite positioning circuitry 545, and user interface circuitry 550. In some embodiments, the device 500 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations.

Application circuitry 505 includes circuitry such as, but not limited to one or more processors (or processor cores), cache memory, and one or more of low drop-out voltage regulators (LDOs), interrupt controllers, serial interfaces such as SPI, I2C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 505 may be coupled with or may include memory/storage elements and may be configured to execute instructions stored in the memory/storage to enable various applications or operating systems to run on the device 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 505 may comprise, or may be, a special-purpose processor/controller to operate according to the various embodiments herein. As examples, the processor(s) of application circuitry 505 may include one or more Apple® processors, Intel® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium (TM), Inc.; a MIPS-based design from MIPS Technologies, Inc. such as MIPS Warrior P-class processors; and/or the like. In some embodiments, the device 500 may not utilize application circuitry 505, and instead may include a special-purpose processor/controller to process IP data received from an EPC or 5GC, for example.

User interface circuitry 550 may include one or more user interfaces designed to enable user interaction with the device 500 or peripheral component interfaces designed to enable peripheral component interaction with the device 500. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The components shown by FIG. 5 may communicate with one another using interface circuitry, which may include any number of bus and/or interconnect (IX) technologies such as industry standard architecture (ISA), extended ISA (EISA), peripheral component interconnect (PCI), peripheral component interconnect extended (PCIx), PCI express (PCIe), or any number of other technologies. The bus/IX may be a proprietary bus, for example, used in a SoC based system. Other bus/IX systems may be included, such as an I2C interface, an SPI interface, point to point interfaces, and a power bus, among others.

FIG. 6 illustrates an example of a device 600 in accordance with various embodiments. In embodiments, the device 600 may be suitable for use an IAB node as of FIGS. 1 and 2, as UEs 400, application servers 430 of FIG. 4, and/or any other element/device discussed herein. The device 600 may be configured with IAB network functions including a mobile termination (MT) function, a distributed unit (DU), and/or central unit (CU) function to serve as an IAB node, IAB parent node, IAB child node, and/or IAB donor node.

The device 600 may include any combinations of the components shown in the example. The components may, for example, include application circuitry 605, baseband circuitry 610, one or more radio front end modules (RFEMs) 615, memory circuitry 620, power management integrated circuitry (PMIC) 625, near-field communication (NFC) circuitry 640, positioning circuitry 545, driver circuitry 646, and user interface circuitry 650, and other suitable components. The components of device 600 may be implemented as integrated circuits (ICs), portions thereof, discrete electronic devices, or other modules, logic, hardware, software, firmware, or a combination thereof adapted in the device 600, or as components otherwise incorporated within a chassis of a larger system. The block diagram of FIG. 6 is intended to show a high level view of components of the device 600. However, some of the components shown may be omitted, additional components may be present, and different arrangement of the components shown may occur in other implementations.

Application circuitry 605 includes circuitry such as, but not limited to one or more processors (or processor cores), cache memory, and one or more of LDOs, interrupt controllers, serial interfaces such as SPI, 120 or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 605 may be coupled with or may include memory/storage elements and may be configured to execute instructions stored in the memory/storage to enable various applications or operating systems to run on the device 600. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

As examples, the processor(s) of application circuitry 605 may include a general or special purpose processor, such as an A-series processor (e.g., the A13 Bionic), available from Apple® Inc., Cupertino, CA or any other such processor. The processors of the application circuitry 605 may also be one or more of Advanced Micro Devices (AMD) Ryzen® processor(s) or Accelerated Processing Units (APUs); Core processor(s) from Intel® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 605 may be a part of a system on a chip (SoC) in which the application circuitry 605 and other components are formed into a single integrated circuit, or a single package.

The baseband circuitry 610 may be implemented, for example, as a solder-down substrate including one or more integrated circuits, a single packaged integrated circuit soldered to a main circuit board or a multi-chip module containing two or more integrated circuits.

The device 600 may also include interface circuitry (not shown) that is used to connect external devices with the device 600. The external devices connected to the device 600 via the interface circuitry include sensor circuitry 621 and electro-mechanical components (EMCs) 622, as well as removable memory devices coupled to removable memory circuitry 623.

A battery 630 may power the device 600, although in some examples the device 600 may be mounted deployed in a fixed location, and may have a power supply coupled to an electrical grid. The battery 630 may be a lithium ion battery, a metal-air battery, such as a zinc-air battery, an aluminum-air battery, a lithium-air battery, and the like. In some implementations, such as in V2X applications, the battery 630 may be a typical lead-acid automotive battery.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or examples of the disclosure herein. Also, one or more of the acts depicted herein may be carried out in one or more separate acts and/or phases. In some examples, the methods illustrated above may be implemented in a computer readable medium using instructions stored in a memory. Many other examples and variations are possible within the scope of the claimed disclosure.

EXAMPLES

Example 1 is an apparatus for a wireless communication device (device) connected in an integrated access backhaul (IAB) network, including one or more processors configured to cause the device to identify distributed unit (DU) resource configuration information for an IAB node device functioning as an IAB node in the IAB network, wherein the IAB node is associated with a parent IAB node; and transmit the DU resource configuration information to the parent IAB node.

Example 2 includes the subject matter of example 1, including or omitting optional subject matter, wherein the one or more processors are configured to cause the device to determine that the device has allocated DU resources to the IAB node device; and transmit the DU resource configuration information describing one or more aspects of the allocated DU resources to the parent IAB node.

Example 3 includes the subject matter of example 2, including or omitting optional subject matter, wherein the one or more processors are configured to cause the device to transmit the DU resource configuration to a DU function of the parent IAB node.

Example 4 includes the subject matter of example 3, including or omitting optional subject matter, wherein the one or more processors are configured to cause the device to transmit the DU resource configuration information using F1-Application Protocol (AP) signaling.

Example 5 includes the subject matter of example 4, including or omitting optional subject matter, wherein the one or more processors are configured to cause the device to transmit the DU resource configuration information using a GNB-DU RESOURCE COORDINATION REQUEST message.

Example 6 includes the subject matter of example 4, including or omitting optional subject matter, wherein the one or more processors are configured to cause the device to transmit the DU resource configuration information using a GNB-DU RESOURCE CONFIGURATION UPDATE message.

Example 7 includes the subject matter of example 2, including or omitting optional subject matter, wherein the one or more processors are configured to cause the device to transmit the DU resource configuration information to a mobile termination (MT) function of the parent IAB node.

Example 8 includes the subject matter of example 7, including or omitting optional subject matter, wherein the one or more processors are configured to cause the device to transmit the DU resource configuration information using radio resource control (RRC) signaling.

Example 9 includes the subject matter of example 8, including or omitting optional subject matter, wherein the one or more processors are configured to cause the device to transmit the DU resource configuration information using downlink-uplink configuration signaling parameter TDD-UL-DL-ConfigCommon.

Example 10 includes the subject matter of example 8, including or omitting optional subject matter, wherein the one or more processors are configured to cause the device to transmit the DU resource configuration information using downlink-uplink configuration signaling parameter TDD-UL-DL-ConfigDedicated.

Example 11 includes the subject matter of example 1, including or omitting optional subject matter, wherein the one or more processors are configured to cause the device to determine that the device has been allocated DU resources to serve as the IAB node device; and transmit the DU resource configuration information describing one or more aspects of the allocated DU resources to the parent IAB node.

Example 12 includes the subject matter of example 11, including or omitting optional subject matter, wherein the one or more processors are configured to cause the device to transmit the DU resource configuration to a DU function of the parent IAB node.

Example 13 includes the subject matter of example 12, including or omitting optional subject matter, wherein the one or more processors are configured to cause the device to transmit the DU resource configuration information using uplink control information (UCI) in a physical uplink control channel (PUCCH).

Example 14 includes the subject matter of example 13, including or omitting optional subject matter, wherein resources for the PUCCH are semi-statically configured.

Example 15 includes the subject matter of example 13, including or omitting optional subject matter, wherein resources for the PUCCH are configured based on semi-persistent scheduling.

Example 16 includes the subject matter of example 13, including or omitting optional subject matter, wherein resources for the PUCCH are configured based on dynamic scheduling.

Example 17 includes the subject matter of example 12, including or omitting optional subject matter, wherein the one or more processors are configured to cause the device to transmit the DU resource configuration using a medium access control (MAC) control element (CE) in a physical uplink shared channel (PUSCH).

Example 18 includes the subject matter of example 17, including or omitting optional subject matter, wherein a reserved logic channel ID field in a MAC service data unit (SDU) is used to transmit the DU resource configuration information.

Example 19 includes the subject matter of example 12, including or omitting optional subject matter, wherein the one or more processors are configured to cause the device to transmit the DU resource configuration using a Layer-1 (L1) channel.

Example 20 includes the subject matter of any one of examples 1-19, including or omitting optional subject matter, wherein the DU resource configuration information includes information describing hard resource configuration.

Example 21 includes the subject matter of any one of examples 1-19, including or omitting optional subject matter, wherein the DU resource configuration information includes information describing hard resource configuration and soft resource configuration.

Example 22 includes the subject matter of any one of examples 1-19, including or omitting optional subject matter, wherein the DU resource configuration information includes information describing hard resource configuration, soft resource configuration, and not available resource configuration.

Example 23 includes the subject matter of any one of examples 1-19, including or omitting optional subject matter, wherein the DU resource configuration information includes information describing hard resource configuration, soft resource configuration, not available resource configuration, and flexible resource configuration.

Example 24 includes the subject matter of any one of examples 1-19, including or omitting optional subject matter, wherein the DU resource configuration information includes information describing hard-downlink resource configuration, hard-uplink resource configuration, and hard-flexible resource configuration.

Example 25 includes the subject matter of any one of examples 1-19, including or omitting optional subject matter, wherein the DU resource configuration information includes information describing hard-downlink resource configuration, hard-uplink resource configuration, hard-flexible resource configuration, soft-downlink resource configuration, soft-uplink resource configuration, and soft-flexible resource configuration.

Example 26 includes the subject matter of any one of examples 1-19, including or omitting optional subject matter, wherein the DU resource configuration information includes information describing hard-downlink resource configuration, hard-uplink resource configuration, hard-flexible resource configuration, soft-downlink resource configuration, soft-uplink resource configuration, soft-flexible resource configuration, and not available resource configuration.

Example 27 is a method, including, with a wireless communication device (device) connected in an integrated access backhaul (IAB) network: identifying distributed unit (DU) resource configuration information for an IAB node device functioning as an IAB node in the IAB network, wherein the IAB node is associated with a parent IAB node; and transmitting the DU resource configuration information to the parent IAB node.

Example 28 includes the subject matter of example 27, including or omitting optional subject matter, including: determining that the device has allocated DU resources to the IAB node device; and transmitting the DU resource configuration information describing one or more aspects of the allocated DU resources to the parent IAB node.

Example 29 includes the subject matter of example 28, including or omitting optional subject matter, including transmitting the DU resource configuration to a DU function of the parent IAB node.

Example 30 includes the subject matter of example 29, including or omitting optional subject matter, including transmitting the DU resource configuration information using F1-Application Protocol (AP) signaling.

Example 31 includes the subject matter of example 30, including or omitting optional subject matter, including transmitting the DU resource configuration information using a GNB-DU RESOURCE COORDINATION REQUEST message.

Example 32 includes the subject matter of example 30, including or omitting optional subject matter, including transmitting the DU resource configuration information using a GNB-DU RESOURCE CONFIGURATION UPDATE message.

Example 33 includes the subject matter of example 28, including or omitting optional subject matter, including transmit the DU resource configuration information to a mobile termination (MT) function of the parent IAB node.

Example 34 includes the subject matter of example 33, including or omitting optional subject matter, including transmitting the DU resource configuration information using radio resource control (RRC) signaling.

Example 35 includes the subject matter of example 34, including or omitting optional subject matter, including transmitting the DU resource configuration information using downlink-uplink configuration signaling parameter TDD-UL-DL-ConfigCommon.

Example 36 includes the subject matter of example 34, including or omitting optional subject matter, including transmitting the DU resource configuration information using downlink-uplink configuration signaling parameter TDD-UL-DL-ConfigDedicated.

Example 37 includes the subject matter of example 27, including or omitting optional subject matter, including determining that the device has been allocated DU resources to serve as the IAB node device; and transmitting the DU resource configuration information describing one or more aspects of the allocated DU resources to the parent IAB node.

Example 38 includes the subject matter of example 37, including or omitting optional subject matter, including transmitting the DU resource configuration to a DU function of the parent IAB node.

Example 39 includes the subject matter of example 38, including or omitting optional subject matter, including transmitting the DU resource configuration information using uplink control information (UCI) in a physical uplink control channel (PUCCH).

Example 40 includes the subject matter of example 39, including or omitting optional subject matter, wherein resources for the PUCCH are semi-statically configured.

Example 41 includes the subject matter of example 39, including or omitting optional subject matter, wherein resources for the PUCCH are configured based on semi-persistent scheduling.

Example 42 includes the subject matter of example 39, including or omitting optional subject matter, wherein resources for the PUCCH are configured based on dynamic scheduling.

Example 43 includes the subject matter of example 38, including or omitting optional subject matter, including transmitting the DU resource configuration using a medium access control (MAC) control element (CE) in a physical uplink shared channel (PUSCH).

Example 44 includes the subject matter of example 43, including or omitting optional subject matter, including transmitting the DU resource configuration using a reserved logic channel ID field in a MAC service data unit (SDU) the DU resource configuration information.

Example 45 includes the subject matter of example 38, including or omitting optional subject matter, including transmitting the DU resource configuration using a Layer-1 (L1) channel.

Example 46 includes the subject matter of any one of examples 27-45, including or omitting optional subject matter, wherein the DU resource configuration information includes information describing hard resource configuration.

Example 47 includes the subject matter of any one of examples 27-45, including or omitting optional subject matter, wherein the DU resource configuration information includes information describing hard resource configuration and soft resource configuration.

Example 48 includes the subject matter of any one of examples 27-45, including or omitting optional subject matter, wherein the DU resource configuration information includes information describing hard resource configuration, soft resource configuration, and not available resource configuration.

Example 49 includes the subject matter of any one of examples 27-45, including or omitting optional subject matter, wherein the DU resource configuration information includes information describing hard resource configuration, soft resource configuration, not available resource configuration, and flexible resource configuration.

Example 50 includes the subject matter of any one of examples 27-45, including or omitting optional subject matter, wherein the DU resource configuration information includes information describing hard-downlink resource configuration, hard-uplink resource configuration, and hard-flexible resource configuration.

Example 51 includes the subject matter of any one of examples 27-45, including or omitting optional subject matter, wherein the DU resource configuration information includes information describing hard-downlink resource configuration, hard-uplink resource configuration, hard-flexible resource configuration, soft-downlink resource configuration, soft-uplink resource configuration, and soft-flexible resource configuration.

Example 52 includes the subject matter of any one of examples 27-45, including or omitting optional subject matter, wherein the DU resource configuration information includes information describing hard-downlink resource configuration, hard-uplink resource configuration, hard-flexible resource configuration, soft-downlink resource configuration, soft-uplink resource configuration, soft-flexible resource configuration, and not available resource configuration.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A wireless communication device comprising a memory and one or more processors configured to, when executing instructions stored in the memory, cause the wireless communication device to:
   allocate distributed unit (DU) resources to a child IAB node, wherein the child IAB node is associated with a parent IAB node; and
   in response to allocating DU resources to the child IAB node, transmit DU resource configuration information indicating one or more aspects of the DU resources to a DU function of the parent IAB node using F1-Application Protocol (AP) signaling that indicates, for each cell of the child IAB node, a resource configuration including frequency resource information.

2. The wireless communication device according to claim 1, wherein the DU resource configuration information comprises information describing one or more of hard-downlink resource configuration, hard-uplink resource configuration, hard-flexible resource configuration, soft-downlink resource configuration, soft-uplink resource configuration, soft-flexible resource configuration, or not available resource configuration.

3. The wireless communication device according to claim 1, wherein the one or more processors are configured to cause the wireless communication device to transmit the DU resource configuration information using a GNB-DU RESOURCE COORDINATION REQUEST message.

4. The wireless communication device according to claim 1, wherein the one or more processors are configured to cause the wireless communication device to transmit the DU resource configuration information using a GNB-DU RESOURCE CONFIGURATION UPDATE message.

5. A method, comprising:
   allocating distributed unit (DU) resources to a child IAB node, wherein the child IAB node is associated with a parent IAB node; and
   in response to allocating DU resources to the child IAB node, transmitting DU resource configuration information to the parent IAB node using F1-Application Protocol (AP) signaling that indicates, for each cell of the child IAB node, a resource configuration including frequency resource information.

6. The method of claim 5, comprising:
   transmitting the DU resource configuration with a GNB-DU RESOURCE COCORDINATION REQUEST message.

7. The method of claim 5, wherein the DU resource configuration information comprises information describing one or more of hard-downlink resource configuration, hard-uplink resource configuration, hard-flexible resource configuration, soft-downlink resource configuration, soft-uplink resource configuration, soft-flexible resource configuration, or not available resource configuration.

8. The method of claim 5, comprising transmitting the DU resource configuration information using F1-Application Protocol (AP) signaling with a GNB-DU RESOURCE CONFIGURATION UPDATE message.

9. The method of claim 5, comprising transmitting the DU resource configuration information to a DU function of the parent IAB node.

10. A processor configured to perform operations, the operations comprising:
   receiving DU resource configuration information identifying soft time-domain resources allocated for a child IAB node in an IAB network, wherein the child IAB node is a direct child of an IAB node associated with the processor, wherein the DU resource configuration information is communicated via F1-Application Protocol (AP) signaling that indicates, for each cell of the child IAB node, a resource configuration including frequency resource information; and
   in response,
      notifying the child IAB node of availability of the soft time-domain resources; and
      managing use of time-domain resources in the IAB network based on the received DU resource configuration information.

11. The processor according to claim 10, wherein the operations comprise avoiding communication with the child IAB node using a time-domain resource in response to the received DU resource configuration information indicating that the time-domain resource is a hard resource of the child IAB node.

12. The processor according to claim 10, wherein the operations comprise receiving the DU resource configuration information with a DU function of the IAB node.

13. The processor according to claim 10, wherein the DU resource configuration information comprises information describing one or more of hard-downlink resource configuration, hard-uplink resource configuration, hard-flexible resource configuration, soft-downlink resource configuration, soft-uplink resource configuration, soft-flexible resource configuration, or not available resource configuration.

14. The processor according to claim 10, wherein the operations comprise receiving the DU resource configuration information in a GNB-DU RESOURCE COORDINATION REQUEST message.

15. The processor according to claim 10, wherein the operations comprise receiving the DU resource configuration information in a GNB-DU RESOURCE CONFIGURATION UPDATE message.

* * * * *